| (12) | United States Patent | (10) Patent No.: US 10,197,842 B2 |
|---|---|---|
| | Kobayashi et al. | (45) Date of Patent: Feb. 5, 2019 |

(54) LIQUID CRYSTAL DISPLAY DEVICE

(71) Applicant: Japan Display Inc., Minato-ku (JP)

(72) Inventors: Masahiro Kobayashi, Tokyo (JP); Junko Nagasawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/483,513

(22) Filed: Apr. 10, 2017

(65) Prior Publication Data

US 2017/0299916 A1    Oct. 19, 2017

(30) Foreign Application Priority Data

Apr. 15, 2016    (JP) ................................. 2016-081844

(51) Int. Cl.
| G02F 1/1339 | (2006.01) |
| G02F 1/1335 | (2006.01) |
| G02F 1/1333 | (2006.01) |
| G02F 1/1337 | (2006.01) |
| G02F 1/1343 | (2006.01) |
| G02F 1/1362 | (2006.01) |
| G02F 1/1368 | (2006.01) |

(52) U.S. Cl.
CPC ...... *G02F 1/133512* (2013.01); *G02F 1/1337* (2013.01); *G02F 1/1339* (2013.01); *G02F 1/1368* (2013.01); *G02F 1/13394* (2013.01); *G02F 1/13439* (2013.01); *G02F 1/133345* (2013.01); *G02F 1/136286* (2013.01); *G02F 1/133514* (2013.01); *G02F 2001/133388* (2013.01); *G02F 2001/133519* (2013.01); *G02F 2001/133738* (2013.01); *G02F 2201/123* (2013.01); *G02F 2202/02* (2013.01)

(58) Field of Classification Search
None
See application file for complete search history.

(56) References Cited

U.S. PATENT DOCUMENTS

| 2008/0129946 | A1* | 6/2008 | Chan ..................... G02F 1/1339 349/153 |
| 2012/0194494 | A1* | 8/2012 | Jung .................. G02F 1/133723 345/208 |
| 2013/0342927 | A1 | 12/2013 | Hino et al. |
| 2014/0320789 | A1* | 10/2014 | Son ....................... G02F 1/1337 349/123 |

FOREIGN PATENT DOCUMENTS

| JP | 2014-16617 | 1/2014 |
| JP | 2014-174431 | 9/2014 |

* cited by examiner

*Primary Examiner* — James Dudek
(74) *Attorney, Agent, or Firm* — Oblon, McClelland, Maier & Neustadt, L.L.P.

(57) ABSTRACT

According to one embodiment, a liquid crystal display device includes a first substrate including a switching element and a pixel electrode, a second substrate including an insulating substrate, an organic layer which covers the insulating substrate in a non-display area in a shape of a frame surrounding a display area and comprises a first recess portion formed therein, and a light-shielding layer which covers the first recess portion, a sealing member which attaches the first substrate and the second substrate in the non-display area and a liquid crystal layer disposed in a space surrounded by the first substrate, the second substrate and the sealing member.

18 Claims, 11 Drawing Sheets

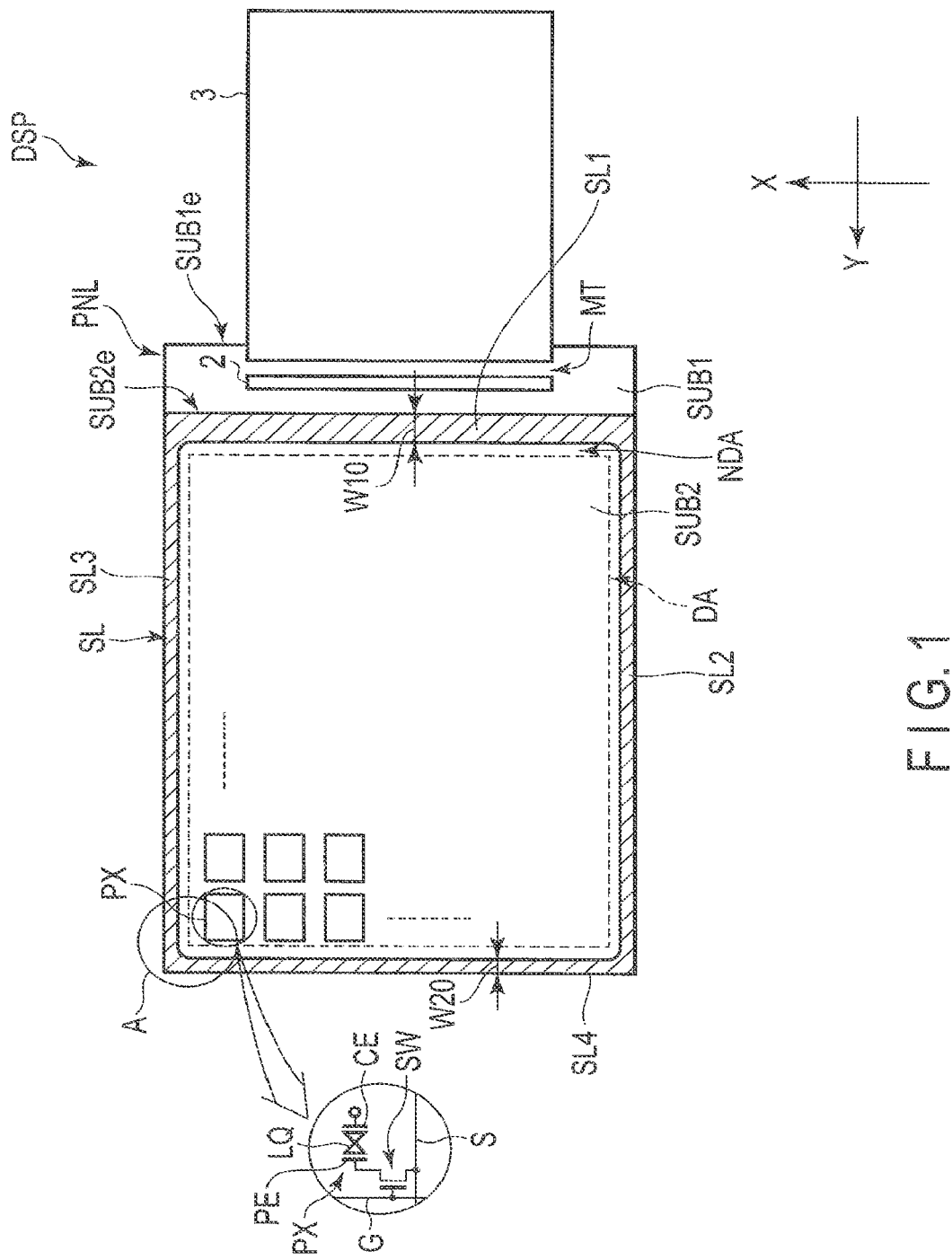
F I G. 1

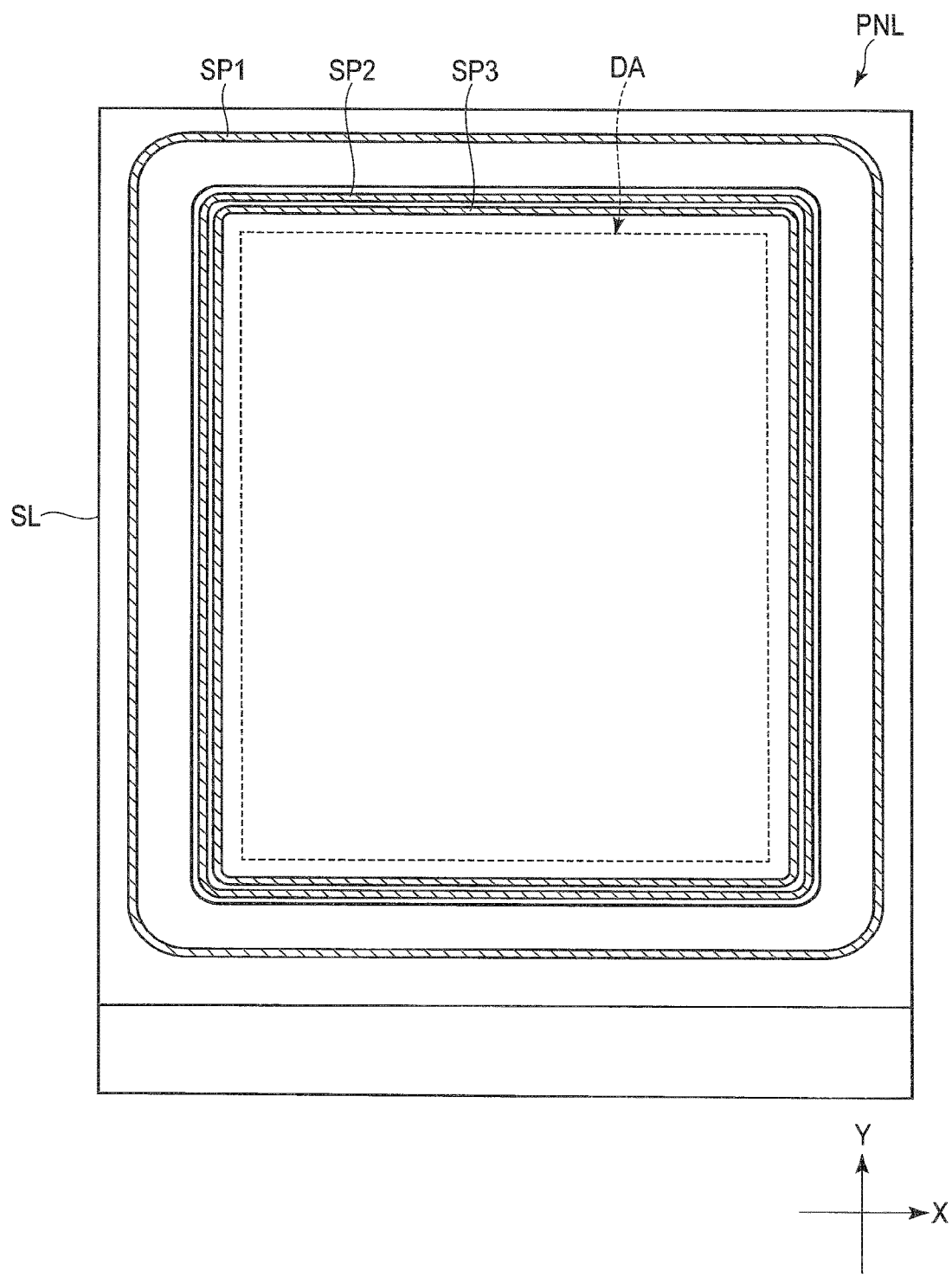
F I G. 5

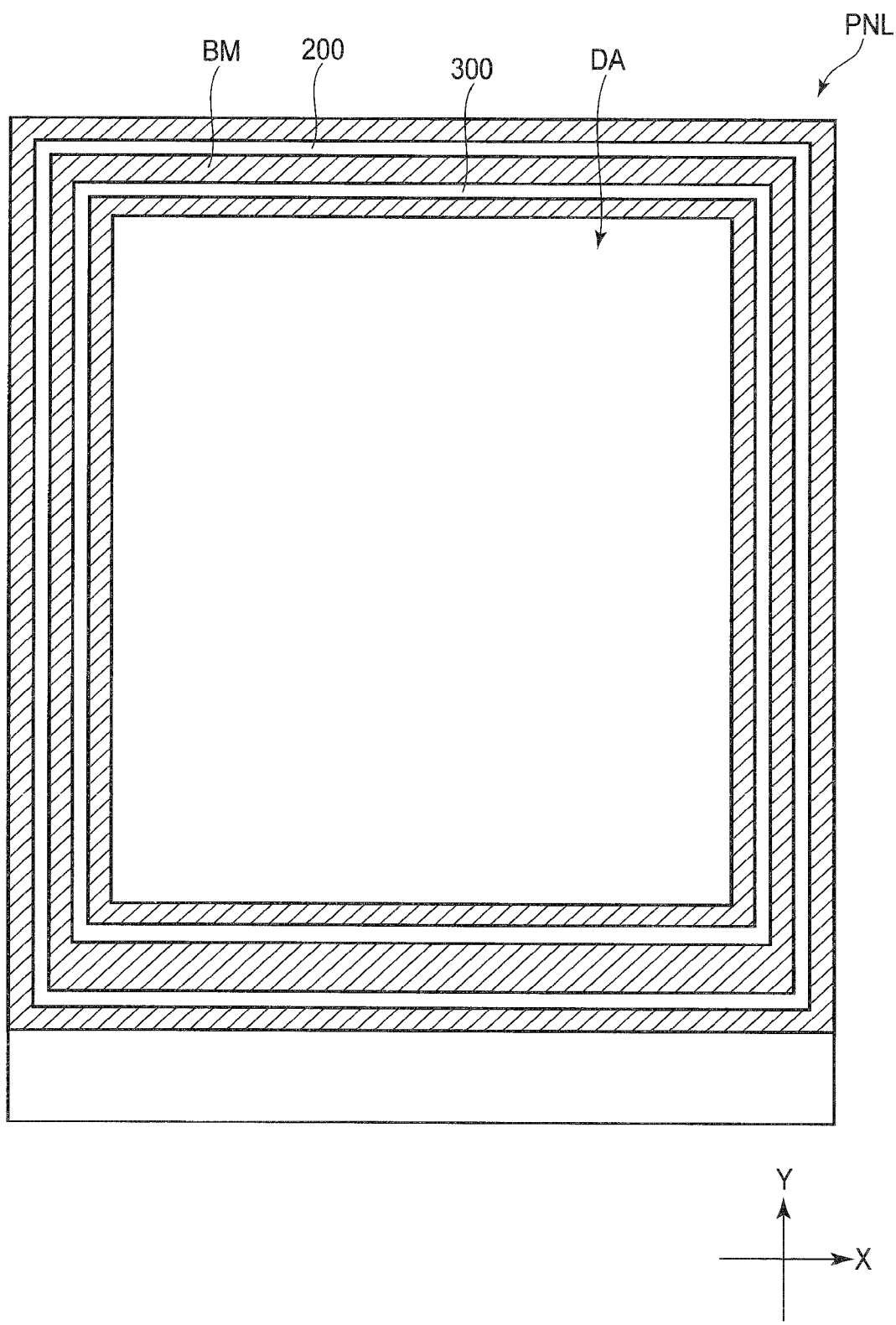
F I G. 6

LIQUID CRYSTAL DISPLAY DEVICE

CROSS-REFERENCE TO RELATED APPLICATIONS

This application is based upon and claims the benefit of priority from Japanese Patent Application No. 2016-081844, filed Apr. 15, 2016, the entire contents of which are incorporated herein by reference.

FIELD

Embodiments described herein relate generally to a liquid crystal display.

BACKGROUND

Liquid crystal displays are used in various fields as display devices. Color liquid crystal displays comprise color filters. Light shielding layers are disposed between color filters of different colors to function of prevention color mixture in an oblique visual field. As a measure to against color mixture in an oblique visual field accompanying further expansion of viewing angle, such a technique is known that a liquid crystal display comprises an overcoat layer to cover a color filter, and a light-shielding layer disposed on a surface of the overcoat layer, which is on the liquid crystal layer.

Moreover, display devices each include a display area which displays images and a non-display area which surrounds the display area. Here, as a technique to remove the drawback that the non-display area may look brighter than the display area when the display is turned OFF, it is known that different coloring layers and light-shielding coloring layers are stacked on the non-display area.

BRIEF DESCRIPTION OF THE DRAWINGS

FIG. 1 is a diagram showing a structure of a display panel of a display device and an equivalent circuit thereof according to an embodiment.

FIG. 5 is a plan view showing the display panel shown in FIG. 1, indicating the positions of spacers.

FIG. 6 is a plan view showing the display panel shown in FIG. 1, indicating the positions of slits formed in the light-shielding layer.

DETAILED DESCRIPTION

Figure 2:
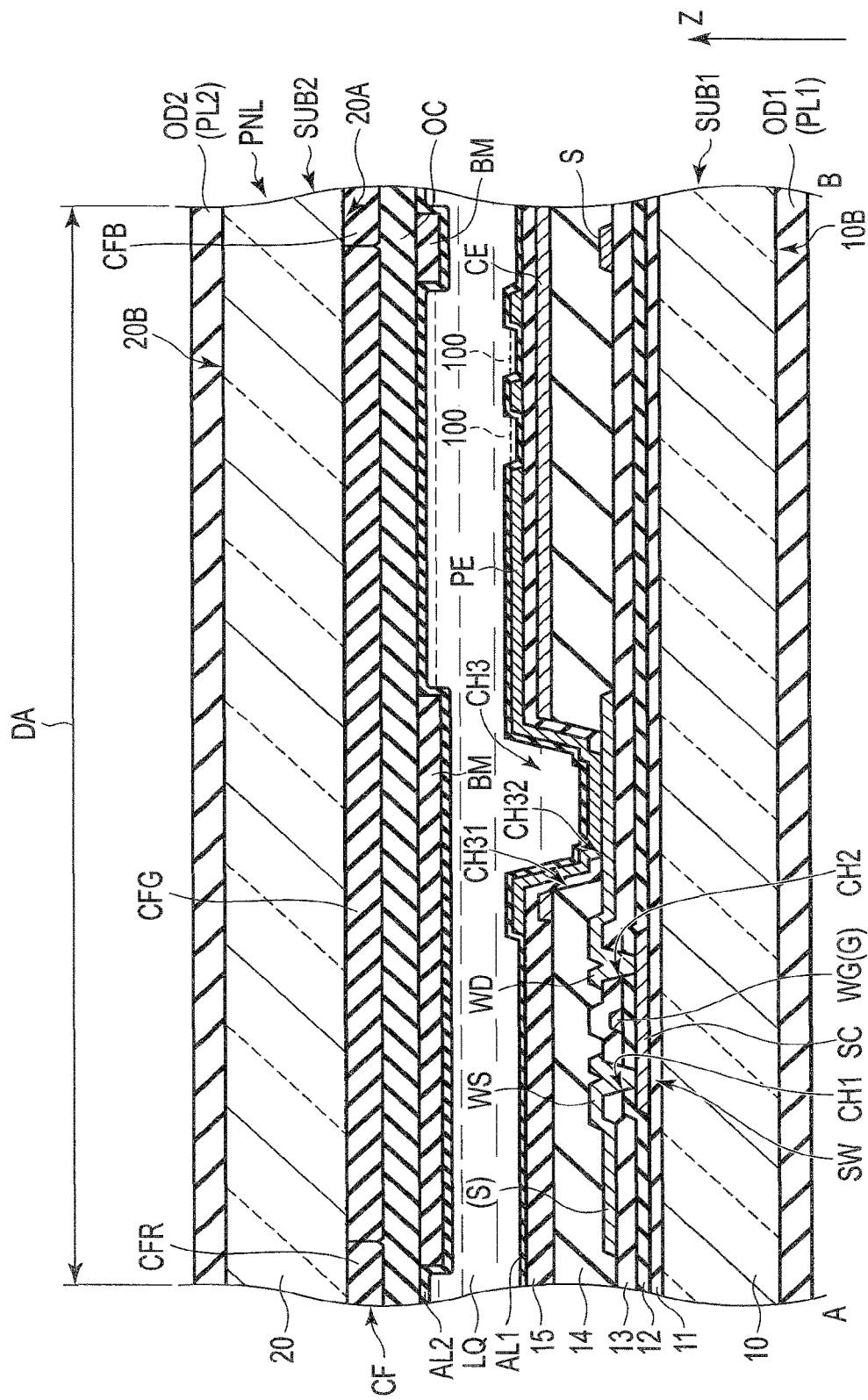
FIG. 2 is a cross section showing a pixel of a display area of the display device and a layer structure thereof, shown in FIG. 1.

In general, according to one embodiment, a liquid crystal display device comprises a first substrate including a switching element and a pixel electrode; a second substrate including an insulating substrate, an organic layer which covers the insulating substrate in a non-display area in a shape of a frame surrounding a display area and comprises a first recess portion formed therein, and a light-shielding layer which covers the first recess portion; a sealing member which attaches the first substrate and the second substrate in the non-display area; and a liquid crystal layer disposed in a space surrounded by the first substrate, the second substrate and the sealing member.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First, a display device according to this embodiment will be described in detail.

FIG. 1 is a diagram showing a structure of a display panel PNL of a display device DSP and an equivalent circuit thereof, according to this embodiment. The embodiment will be described on an assumption case where the display device DSP is a liquid crystal display.

FIG. 1 is a plan view of the display panel PNL in an X-Y plane defined along a first direction X and a second direction Y, which cross each other. In the illustrated example, the first direction X and the second direction Y cross each other orthogonally, but they may cross at an angle other than 90 degree.

The display panel PNL comprises a first substrate SUB1, a second substrate SUB2 disposed to oppose the first substrate SUB1 and a liquid crystal layer LQ held between the first substrate SUB1 and the second substrate SUB2. The first substrate SUB1 and the second substrate SUB2 are attached together with a sealing member SL while keeping a predetermined cell gap therebetween. The liquid crystal layer LQ is held in an inner portion surrounded by the sealing member SL in the cell gap between the first substrate SUB1 and the second substrate SUB2. The display panel PNL comprises a display area DA which displays images to the inner portion surrounded by the sealing member SL. The display area DA has approximately a rectangular shape, for example, and a plurality of pixels PX arranged in a matrix are disposed in the display area DA. The display area DA may have some other polygonal shape, and further, edges thereof may be curved.

The first substrate SUB1 comprises, in the display area DA, gate lines G extending along the first direction X, source lines S extending along the second direction Y, switching elements SW each electrically connected to a respective gate line G and a respective source line S in a respective pixel PX, pixel electrodes PE each electrically connected to a switching element SW in a respective pixel PX, etc. In this embodiment, a common electrode CE is included in the first substrate SUB1.

The display panel PNL may be configured as a transmissive type which displays images by selectively transmitting light from a backlight unit placed on its, rear surface side, or a reflective type which displays images by selectively reflecting external light entering the display panel PNL, or a trans-reflective type which is a combination of the transmission type and reflection type.

Signal supply sources necessary to drive the display panels PNL, such as a drive IC chip 2 and a flexible printed circuit (FPC) substrate 3 are located in the non-display area NDA surrounding the display area DA as a frame. In the example illustrated, the drive IC chip 2 and the FPC substrate 3 are mounted in a mounting portion MT of the first substrate SUB1, which extends out from one substrate side edge SUB2e of the second substrate SUB2. The mounting portion MT is formed along with one substrate side edge SUB1e of the first substrate SUB1. Although will not be explained in detail, the first substrate SUB1 comprises, in the mounting portion MT, a pad to connect it to the signal supply sources. The pad includes the gate lines G, source lines S, etc. described above, which are electrically connected. In the example illustrated, the other three substrate-side edges of the second substrate SUB2 oppose the other three substrate-side edges of the first substrate SUB1.

The sealing member SL is formed on the non-display area NDA to have a frame shape which encloses the display area DA. The sealing member SL is formed into a rectangular shape in the example illustrated. The sealing member SL includes a first seal portion SL1, a second seal portion SL2, a third seal portion SL3 and a fourth seal portion SL4. The seal portion SL1 and the fourth seal portion SL4 each extend along the first direction X and they oppose each other while interposing the display area DA therebetween. The second seal portion SL2 and the third seal portion SL3 each extend along the second direction Y and they oppose each other while interposing the display area DA therebetween. The first seal portion SL1 is arranged along with the mounting portion MT. A width W10 of the first seal portion SL1 along the second direction Y is larger than a width W20 of the fourth seal portion SL4 along the second direction Y. Moreover, in the example illustrated, a width of the second seal portion SL2 along the first direction X and a width of the third seal portion SL3 along the first direction X are equivalent in dimension to the width W20 of the fourth seal portion SL4. That is, the first seal portion SL1 is arranged on a mounting portion MT side, and therefore is formed to be wider than the second seal portion SL2, the third seal portion SL3 and the fourth seal portion SL4.

FIG. 2 is a cross section showing a pixel PX of the display area DA of the display device DSP shown in FIG. 1 and the layer structure thereof. In this embodiment, in the display panel PNL, both of pixel electrode PE and common electrode CE are provided on the first substrate SUB1, and they are applied to modes which use a lateral electric field along the main plane of the substrate, such as In-Plane Switching (IPS) mode and Fringe Field Switching (FFS) mode, which is one type of the IPS mode.

In this embodiment, the positive direction of the third direction Z or the direction from the first substrate SUB1 to the second substrate SUB2 is defined as upward or above, and the negative direction of the third direction Z or the direction from the second substrate SUB2 to the first substrate SUB1 is defined as downward or below. Moreover, such expressions as "the second member above the first member" and "the second member below the first member", the second member may be in contact with the first member or may be separated from the first member. When the second member is separated from the first member, the third member may be interposed between the first member and the second member. Meanwhile, such expressions as "the second member on the first member" and "the second member under the first member", the second member is in contact with the first member.

The first substrate SUB1 comprises a first insulating substrate 10, a switching element SW, a common electrode CE, a pixel electrode PE, a first insulating film 11, a second insulating film 12, a third insulating film 13, a fourth insulating film 14, a fifth insulating film 15, a first alignment film AL1 and the like.

The first insulating substrate 10 is a light-transmissive substrate such as a glass or resin substrate. The first insulating film 11 covers the first insulating substrate 10.

A semiconductor layer SC of the switching element SW is located on the first insulating film 11 and is covered by the second insulating film 12. The second insulating film 12 is located also on the first insulating film 11. A gate electrode WG of the switching element SW is formed to be integrated with the gate line G on the second insulating film 12, and is located above the semiconductor layer SC. The gate electrode WG is covered by the third insulating film 13 with the gate line G. The third insulating film 13 is located also on the second insulating film 12.

A source electrode WS and a drain electrode WD of the switching element SW are formed on the third insulating film 13. Further, a source line S is similarly formed on the third insulating film 13. The source electrode WS is formed to be integrated with the source line S. The source electrode WS is in contact with the semiconductor layer SC through a contact hole CH1 which penetrates the second insulating film 12 and the third insulating film 13. The drain electrode WD is in contact with the semiconductor layer SC through a contact hole CH2 which penetrates the second insulating film 12 and the third insulating film 13. The fourth insulating film 14 covers the switching element SW and the source line S. The fourth insulating film 14 is located also on the third insulating film 13.

The common electrode CE is formed on the fourth insulating film 14. The common electrode CE is a transparent electrode formed from a transparent conductive material such as indium-tin-oxide (ITO) or indium zinc oxide (IZO). The fifth insulating film 15 covers the common electrode CE. The fifth insulating film 15 is located also on the fourth insulating film 14.

The pixel electrode PE is formed on the fifth insulating film 15 in a position to oppose the common electrode CE. The pixel electrode PE comprises slits 100. The slits 100 are each formed above the common electrode CE. The pixel electrode PE is a transparent electrode formed from a transparent conductive material, for example, ITO or IZO. The pixel electrode PE is in contact with the drain electrode WD of the switching element SW through a contact hole CH3. The contact hole CH3 comprises a contact hole CH31 penetrating the fourth insulating film 14 to the drain electrode WD and a contact hole CH32 penetrating the fifth insulating film 15 to the drain electrode WD.

The first alignment film AL1 covers the pixel electrode PE. The first alignment film AL1 also covers the fifth insulating film 15. The first alignment film AL1 is formed from a material which exhibits horizontal alignment property and disposed on a surface of the first substrate SUB1, which is in contact with the liquid crystal layer LQ.

The first insulating films 11, the second insulating film 12, the third insulating film 13, and the fifth insulating film 15 described above are each formed from, for example, an inorganic material such as silicon oxide and silicon nitride. The fourth insulating film 14 is formed from, for example, an organic material such as a transparent resin.

The second substrate SUB2 comprises a second insulating substrate 20, color filters CF, an overcoat layer OC, a light-shielding layer BM, a second alignment film AL2 and the like.

The second insulating substrate 20 is a light-transmissive substrate such as a glass or resin substrate.

The color filters CF are disposed on an inner surface 20A of the second insulating substrate 20. The color filters CF are formed from resin materials colored in a plurality of colors different from each other, for example, red, blue and green. A red color filter CFR is disposed to correspond to a red pixel, a green color filter CFG is disposed to correspond to a green pixel, and a blue color filter CFB is disposed to correspond to a blue pixel.

The overcoat layer OC covers the color filters CF. The overcoat layer OC flattens unevenness on the surfaces of the color filters CF. The overcoat layer OC is formed from a transparent resin material.

The light-shielding layer BM is disposed on a surface of the overcoat layer OC, which is on a side opposing the first substrate SUB1. The light-shielding layer BM is located to partition into pixels PX and oppose the wiring lines of the first substrate SUB1 such as the gate line G, source line S and switching element SW and the contact hole CH3. Although will not be explained in detail, the light-shielding layer BM formed to oppose each of the gate line G and source line S has a shape of lattice. The boundaries between adjacent color filters CF of different colors are located to overlay on the light-shielding layer BM.

The second alignment film AL2 covers the light-shielding layer BM. The second alignment film AL2 also covers the overcoat layer OC. The second alignment film AL2 is formed from a material which exhibits horizontal alignment property and disposed on a surface of the first substrate SUB2, which is in contact with the liquid crystal layer LQ. The first substrate SUB1 and the second substrate SUB2 are arranged so that the first alignment film AL1 and the second alignment film AL2 oppose each other. Here, between the first substrate SUB1 and the second substrate SUB2, a predetermined cell gap is formed of a spacer (not shown). The first substrate SUB1 and the second substrate SUB2 are attached together with a sealing member while maintaining the cell gap. The liquid crystal layer LQ is formed of a liquid crystal composition enclosed in the cell gap.

In an outer surface 10B of the first substrate SUB1, that is, an external surface 10B of the first insulating substrate 10, a first optical element OD1 including a first polarizer PL1 is disposed. In an outer surface of the second substrate SUB2, that is, an outer surface 20B of the second insulating substrate 20, a second optical element OD2 including a second polarizer PL2 is disposed. A first absorption axis of the first polarizer PL1 and a second absorption axis of the second polarizer PL2 are, for example, in a crossed-Nicol relationship in position.

Figure 3:
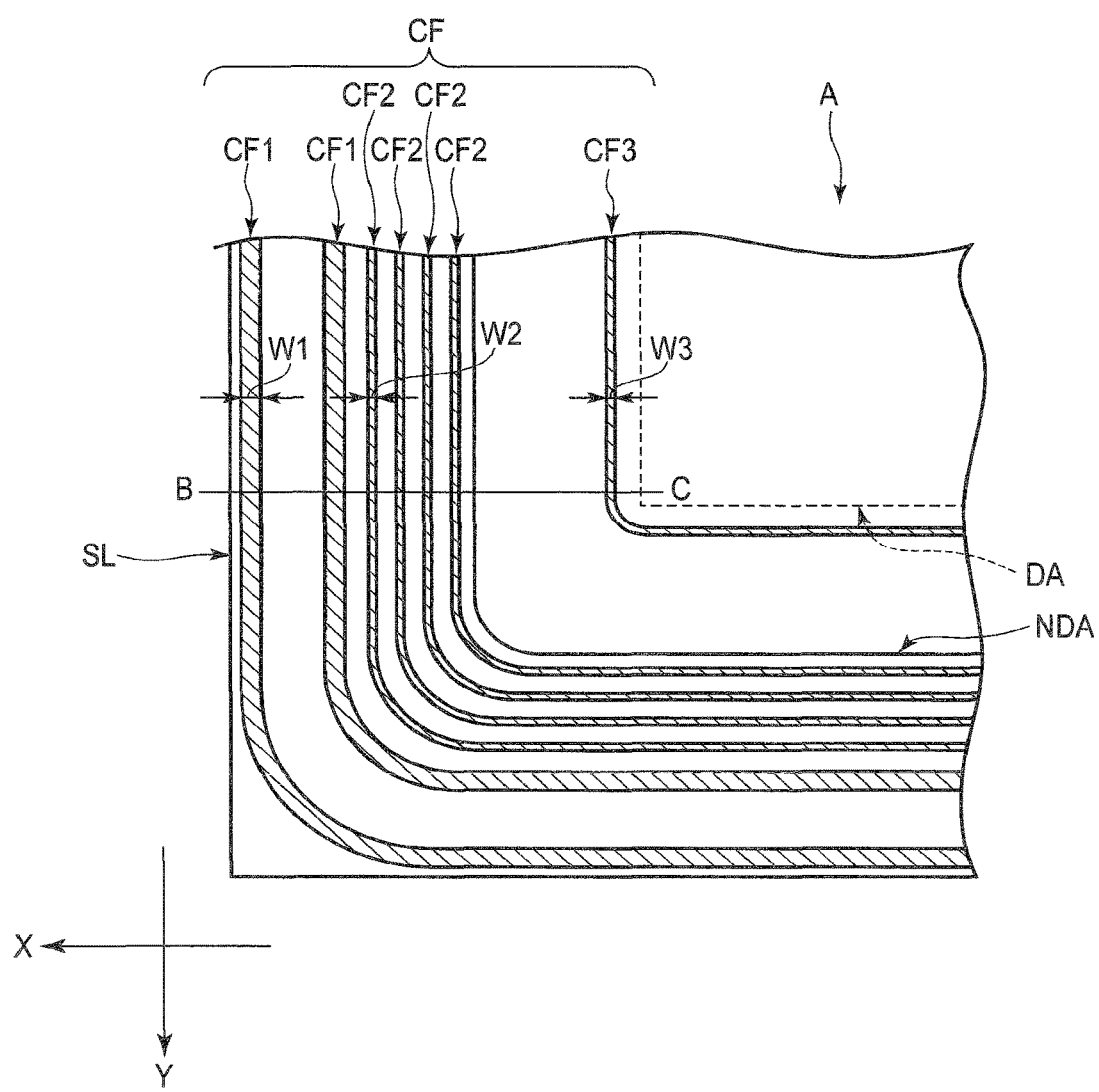
FIG. 3 is an enlarged view of an area A of the display panel shown in FIG. 1.

FIG. 3 is an enlarged view of the area A of the display panel PNL shown in FIG. 1.

The color filters CF are located also in the non-display area NDA. Each color filter CF in the non-display area NDA includes a first portion CF1, a second portion CF2 and a third portion CF3. The second portion CF2 is located on an outer circumferential side to the third portion CF3 and on an inner circumferential side to the first portion CF1. A width W1 of the first portion CF1 is greater than a width W2 of the second portion CF2. A width W3 of the third portion CF3 is equivalent to the width W2 of the second portion CF2, for example. The first portion CF1 and the second portion CF2 are arranged to overlap the sealing member SL as seen in plan view. The third portion CF3 is located in, for example, an area which does not overlap the sealing member SL in as seen in plan view. In the illustrated example, the width W1, W2 and W3 are taken along the first direction X.

Figure 4:
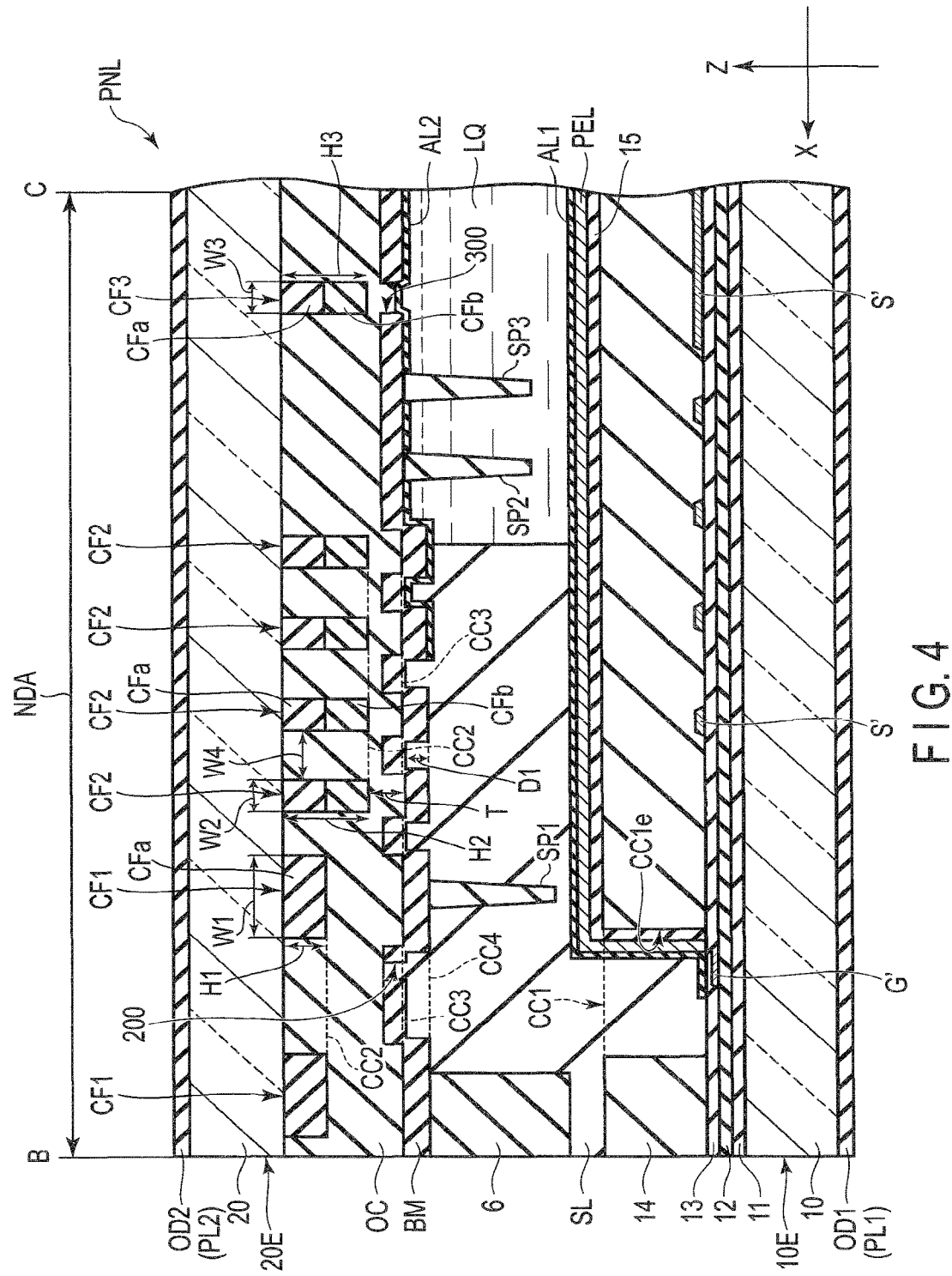
FIG. 4 is a cross section of the display panel taken along line B-C in FIG. 3.

FIG. 4 is a diagram showing a cross section of the display panel PNL taken along line B-C in FIG. 3.

In the illustrated example, the first insulating film 11, the second insulating film 12, the third insulating film 13 and the fourth insulating film 14 extend to the non-display area NDA, or even to an edge portion 10E of the first insulating substrate 10. The fifth insulating film 15 and the first alignment film AL1 are arranged to extend to the non-display area NDA, but not fully to reach the edge portion 10E of the first insulating substrate 10. Further, a transparent conductive layer PEL is arranged between the fifth insulating film 15 and the first alignment film AL1. The transparent conductive layer PEL is insulated from the pixel electrode PE disposed in the display area DA. Moreover, the transparent conductive layer PEL is formed from the same material and by the same process as those of the pixel electrode PE disposed in the display area DA.

The fourth insulating film 14 has a recess portion CC1. The recess portion CC1 penetrates to the third insulating film 13. In the illustrated example, the fifth insulating film 15 is disposed inside the recess portion CC1 such as to cover a side surface CC1e of the recess portion CC1. The transparent conductive layer PEL is disposed inside the recess portion CC1 to be placed along the with side surface CC1e of the recess portion CC1. The transparent conductive layer PEL covers the fifth insulating film 15 inside the recess portion CC1. The first alignment film AL1 covers the transparent conductive layer PEL inside of the recess portion CC1.

For example, when the transparent conductive layer PEL does not cover the fifth insulating film 15 in the recess portion CC1, the first alignment film AL1 is in contact with the fifth insulating film 15 in the recess portion CC1. Here, while the first alignment film AL1 is being subjected to optical alignment treatment, ultraviolet rays irradiated onto the first alignment film AL1 may reach the interface between the first alignment film AL1 and the fifth insulating film 15, which may result in degrading in the bonding strength between the first alignment film AL1 and the fifth insulating film 15. In the illustrated example, however, the transparent conductive layer PEL covers the fifth insulating film 15 in the area overlapping the sealing member SL, thereby making it possible to inhibit the first alignment film AL1 from detaching. Further, as described above, the fifth insulating film 15 covers the side surface CC1e of the recess portion CC1, and therefore the entering of moisture from the side surface CC1e to the fourth insulating film 14 can be inhibited. Furthermore, the first alignment film AL1 is in contact with the third insulating film 13 inside recess portion CC1, and therefore the entering of moisture from the interfaces between the fourth insulating film 14, the fifth insulating film 15 and the transparent conductive layer PEL can be inhibited.

As shown in FIG. 3, the color filters CF are located also in the non-display area NDA. In the display area DA and the non-display area NDA, the color filters CF are arranged in the same layers, respectively. Moreover, as shown in FIG. 3, the width W1 of the first portions CF1 is greater than the width W2 of the second portions CF2. In this embodiment, the width W1 is about 50 to 60 µm, and the width W2 is about 20 µm, for example. In the illustrated example, the width W3 of the third portion CF3 is substantially equivalent to the width W2 of the second portions CF2 and is about 20

μm. Further, the first portions CF1 have a height H1 along the third direction Z and the second portions CF2 have a height H2 along the third direction Z. The height H1 is less than the height H2. In this embodiment, the height H1 is about 2 to 3 μm and the height H2 is about 4 to 6 μm, for example. In the illustrated example, a height H3 of the third portion CF3 is substantially equivalent to the height H2 of the second portions CF2 and is about 4 to 6 μm. A width W4 between adjacent second portions CF2 is about 30 μm or more, for example.

In the illustrated example, the first portions CF1 each include a first layer CFa of a single layer. The second portions CF2 each include a first layer CFa and a second layer CFb, which is a stacked layer comprising the first layer CFa and the second layer CFb. Further, the third portion CF3 includes the first layer CFa and the second layer CFb, which is a stacked layer comprising the first layer CFa and the second layer CFb. The first layer CFa is located under the second insulating substrate 20 and the second layer CFb is under the first layer CFa. The first layer CFa of each first portion CF1 and the first layer CFa of each second portion CF2 have the same height along the third direction Z, for example.

The first layer CFa of each first portion CF1, the first layer CFa of each second portion CF2 and the first layer CFa of each third portion CF3 are formed from the same material, which is also the same as that of one of the color filters CFR, CFG and CFB of the display area DA. Further, the second layer CFb of each second portion CF2 and the second layer CFb of the third portion CF3 are formed from the same material, which is also the same as that of one of the color filters CFR, CFG and CFB of the display area DA. In addition, the first layer CFa and the second layer CFb are formed from resin materials colored in different colors. In this embodiment, the first layer CFa is formed from the same material as that of the blue color filter CFB and the second layer CFb is formed from the same material as that of the red color filter CFR, for example.

Note that the second portions CF2 and third portions CF3 each may have a third layer under the second layer CFb, which forms a stacked structure comprising the first layer CFa, the second layer CFb and the third layer. Here, the first layer CFa, the second layer CFb and the third layer are formed of resin materials colored in different colors, respectively. Between adjacent first portions CF1, between adjacent second portions CF2 and between a first portion CF1 and a second portion CF2 adjacent to each other, recess portions CC2 are respectively formed. The recess portions CC2 are formed to penetrate to the second insulating substrate 20.

The overcoat layer OC covers the color filters CF also in the non-display area NDA. In this embodiment, a thickness T of portions of the overcoat layer OC located under the second portions CF2 along the third direction Z is about 0.5 to 1 μm. The overcoat layer OC is located also in the recess portions CC2. The overcoat layer OC comprises recess portions CC3 at positions of the color filters CF, which overlap the recess portions CC2. The recess portions CC2 and CC3 arranged between adjacent first portions CF1 are located at positions opposing the recess portions CC1 provided in the first substrate SUB1.

In this embodiment, the color filters CF and the overcoat layer OC are equivalent to organic layers which cover the second insulating substrate 20 in the non-display area NDA. The color filters CF are equivalent to a first organic insulating film and the overcoat layer OC is equivalent to a second organic insulating film.

The light-shielding layer BM covers the overcoat layer OC in the non-display area NDA. The light-shielding layer BM covers the recess portions CC3 of the overcoat layer OC. That is, the light-shielding layer BM is located in positions of the color filters CF, which overlap the recess portions CC2. A recess portion CC4 is formed to follow the shape of the recess portion CC3, in a surface of the light-shielding layer BM, which opposes the first substrate SUB1. In this embodiment, a depth D1 of the recess portion CC4 of the light-shielding layer BM is about 1.5 to 1.7 μm.

The light-shielding layer BM comprises a slit 200 in a position which overlaps a recess portion CC2. Therefore, the entering path of moisture transmitting the light-shielding layer BM or that transmitting the interface of the light-shielding layer BM can be blocked by the slit 200. Further, the first substrate SUB1 comprises a peripheral wiring line G' in the same layer as that of the gate line G in a position which overlaps the slit 200. Thus, the leakage of light from the slit 200 can be suppressed. Note that the first substrate SUB1 may comprise other wiring lines in the position overlapping the slit 200.

The light-shielding layer BM comprises a slit 300 in a region of the non-display area NDA, which overlaps the liquid crystal layer LQ. Thus, in the manufacturing process of the display panel PNL, it is possible to suppress the concentration of static electricity on the display area DA and damage to the display panel PNL. Further, the first substrate SUB1 comprises peripheral wiring lines S' in the same layer as that of the source line S in a position which overlaps the slit 300. Thus, the leakage of light from the slit 200 can be suppressed. Note that the first substrate SUB1 may comprise other wiring lines in the position overlapping the slit 200. Further, the third portion CF3 is located in a position which overlaps the slit 300. The third portion CF3 is formed from the first layer CFa and the second layer CFb of different colors stacking along the third direction Z and therefore the third portion CF3 can further suppress the light leakage from the slit 300. A width of the third portion CF3 along the first direction X is greater than that of the slit 300 along the first direction X.

The Second substrate SUB2 comprises spacers SP1, SP2 and SP3 in the non-display area NDA on a side of the light-shielding layer BM, which opposes the first substrate SUB1. The spacer SP1 is disposed inside the sealing member SL. The spacers SP2 and SP3 are located in positions which overlap the liquid crystal layer LQ. As will be described later, the spacer SP1, SP2 and SP3 may be formed into the shape of a continuous wall along the entire circumference of the non-display area NDA, or may be into the shape of a discontinuous wall or the shape of dotted pillars. The spacer SP1 suppress the spreading of the liquid crystal layer LQ W while the sealing member SL has not yet hardened during the process of attaching the first substrate SUB1 and the second substrate SUB2 together. Thus, it is possible to suppress degradation of the bonding strength, which may be caused by the liquid crystal layer LQ entering to the interfaces between the sealing member SL, the first substrate SUB1 and the second substrate SUB2. Further, the spacers SP2 and SP3 inhibit the spreading of the sealing member SL in the liquid crystal layer LQ. Further, the spacers SP2 and SP3 inhibit the spreading of the second alignment film AL2 while the material of the second alignment film AL2 is being applied. Note that the number of spacers SP1, SP2 and SP3 formed is not particularly limited.

Further, the second substrate SUB2 comprises a projection part 6 in the non-display area NDA on a side of the light-shielding layer BM, which opposes the first substrate SUB1. An end of the projection 6, the edge portion 10E of the first insulating substrate 10 and the edge portion 20E of the second insulating substrate 20 are located substantially on a straight line along the third direction Z. The projection 6 may be formed in the shape of a continuous wall which surrounds the display area DA, or may be into the shape of a discontinuous wall or the shape of dotted pillars. Further, the projection 6 may be disposed in the first substrate SUB1.

The display panel PNL is manufactured, for example, by attaching a first mother board from which a plurality of first substrates SUB1 are obtained and a second mother board from which a plurality of second substrates SUB2 are obtained, together with the sealing member SL, followed by cutting. Here, the projection 6 is located on each of cut lines of the first mother board and the second mother board, and thus the sealing member SL is not substantially interposed along the cut lines. For this reason, the external stress applied while cutting is concentrated toward the projection 6, thereby making it possible to suppress the occurrence of cutting errors in the first mother board and the second mother board. Moreover, since the sealing member SL is not substantially present in the positions along the cut lines, the display panels PNL cut off can be easily separated from each other.

The second alignment film AL2 is arranged to extend to the non-display area NDA, but end without reaching the edge portion 20E of the second insulating substrate 20. Note that the second alignment film AL2 may extend all the way to the edge portion 20E of the second insulating substrate 20.

The sealing member SL is disposed also inside the recess portion CC1 formed in the first substrate SUB1. Further, the sealing member SL is in contact with the light-shielding layer BM and also disposed inside the recess portion CC4 of the light-shielding layer BM. The sealing member SL is in contact also with second alignment film AL2. The sealing member SL is in contact with the second alignment film AL2 at a position overlapping the light-shielding layer BM which covers the recess portions CC3. The sealing member SL can be formed from, for example, a heat-curing epoxy resin, or a photo-curing (for example, ultraviolet-curing) acrylic resin. In the case of the latter, the material of the sealing member SL contains an epoxy resin, and therefore the bonding strength between the sealing member SL and the substrates (the first and second substrates SUB1 and SUB2) can be enhanced.

According to this embodiment, the second substrate SUB2 comprises, in the non-display area NDA, the overcoat layer OC and the light-shielding layer BM to cover the overcoat layer OC in which the recess portions CC3 are formed. In the surface of the light-shielding layer BM, which opposes the first substrate SUB1, the recess portion CC4 is formed along the shape of the recess portion CC3. The sealing member SL is in contact with the light-shielding layer BM and disposed inside the recess portion CC4. For this reason, as compared to the case where the light-shielding layer BM is formed substantially flat, the contact area between the sealing member SL and the light-shielding layer BM can be expanded. Thus, the bonding strength between the sealing member SL and the second substrate SUB2 can be enhanced.

Further, the first substrate SUB1 comprises, in the non-display area NDA, the fourth insulating film 14 in which the recess portion CC1 is formed. The sealing member SL is disposed inside the recess portion CC1. Thus, the contact area between the sealing member SL and the first substrate SUB1 can be expanded. Therefore, the bonding strength between the sealing member SL and the first substrate SUB1 can be enhanced.

As described above, the bonding strength between the first substrate SUB1 and second substrate SUB2 by the sealing member SL can be enhanced.

Furthermore, since the bonding strength between the sealing member SL and the light-shielding layer BM improved, it is possible to inhibit moisture entering from the outside of the display panel PNL from transmitting the interface between the sealing member SL and the light-shielding layer BM to enter the liquid crystal layer LQ. Therefore, it is possible to suppress the occurrence of black non-uniformity in display, which may be caused by moisture entering the liquid crystal layer LQ.

Moreover, the recess portions CC2 are formed the color filters CF, and therefore the recess portions CC3 of the overcoat layer OC can be formed in positions overlying the recess portions CC2, respectively. More specifically, the color filters CF are formed to comprise the recess portions CC2 in advance, and then the overcoat layer OC to cover the color filters CF and the recess portions CC2 are formed. In this way, a level difference is created between in the portion located under the color filters CF and the portion located at the recess portions CC2, thereby making it possible to form the recess portions CC3, respectively. Therefore, it becomes unnecessary to prepare a photomask having different transmissivity from one location to another, for preparing the overcoat layer OC. Further, the process of patterning a photoresist to partially etch the overcoat layer OC becomes unnecessary. Therefore, the manufacturing process can be simplified, and also the manufacturing cost can be reduced.

Further, the color filters CF in the non-display area NDA are provided in the same layers as those of the color filters CFR, CFG and CRB in the display area DA, and they are formed from the same material as that of any of the color filters CFR, CFG and CFB, thus making it possible to form them simultaneously in the process of forming the color filters CFR, CFG and CFB. Therefore, it becomes unnecessary to provide separate processing steps for forming the color filters CF in the non-display area NDA.

Moreover, according to this embodiment, the light-shielding layer BM is located on the first substrate SUB1 as compared to the color filters CF and is disposed on a side of the overcoat layer OC, which opposes the first substrate SUB1. With this structure, it is possible to inhibit degradation of the display quality by color mixture even if the display panel PNL is viewed from an oblique direction. Further, it is no longer necessary to expand the width of the light-shielding layer BM for prevention of color mixture, and therefore the reduction of the area which contributes to display per pixel can be suppressed. Consequently, the aperture ratio can be improved, thereby making it possible to further improve the definition and brightness.

In the illustrated example, the color filters CF comprise the recess portions CC2, and accordingly the recess portions CC3 are formed in the overcoat layer OC, but the embodiment is not limited to this. The recess portions CC3 may be formed in the overcoat layer OC without forming the recess portions CC2 in the color filters CF. In that case, for example, the recess portions CC3 of the overcoat layer OC are formed by half-tone exposure.

Moreover, the second portion CF2 need not to be formed, or the recess portion CC4 may be formed in the surface of the light-shielding layer BM by forming a recess portion CC3 in the overcoat layer OC.

FIG. 5 is a plan view showing the display panel PNL shown in FIG. 1, illustrating the positions of spacers SP1, SP2 and SP3.

In the example illustrated, the spacers SP1, SP2 and SP3 are formed continuously in the entire circumference of the non-display area NDA. With the spacer SP1 located in the illustrated manner, the spreading of the liquid crystal layer LQ, which may occur while attaching the first substrate SUB1 and the second substrate SUB2 together, can be blocked around the entire circumference of the non-display area NDA. Further, the spacers SP2 and SP3 so arranged, the spreading of the sealing member SL to the liquid crystal layer LQ, which may occur while attaching the first substrate SUB1 and the second substrate SUB2 together, can be blocked around the entire circumference of the non-display area NDA.

FIG. 6 is a plan view showing the display panel PNL shown in FIG. 1, illustrating the positions of slits 200 and 300 formed in the light-shielding layer BM. FIG. 6 shows the section of the light-shielding layer BM, which is located in the non-display area NDA, and the section located in the display area DA is omitted.

In the illustrated example, the slits 200 and 300 are formed around the entire circumference of the non-display area NDA. With the slit 200 so arranged, it is possible to prevent the moisture transmitting the light-shielding layer BM and the moisture transmitting the interface of the light-shielding layer BM from entering the liquid crystal layer LQ over the entire circumference of the non-display area NDA. Further, the slit 300 so arranged, it is possible to suppress the concentration of static electricity on the display area DA. The third portion CF3 opposes the slit 300 over the entire circumference of the non-display area NDA.

Figure 7:
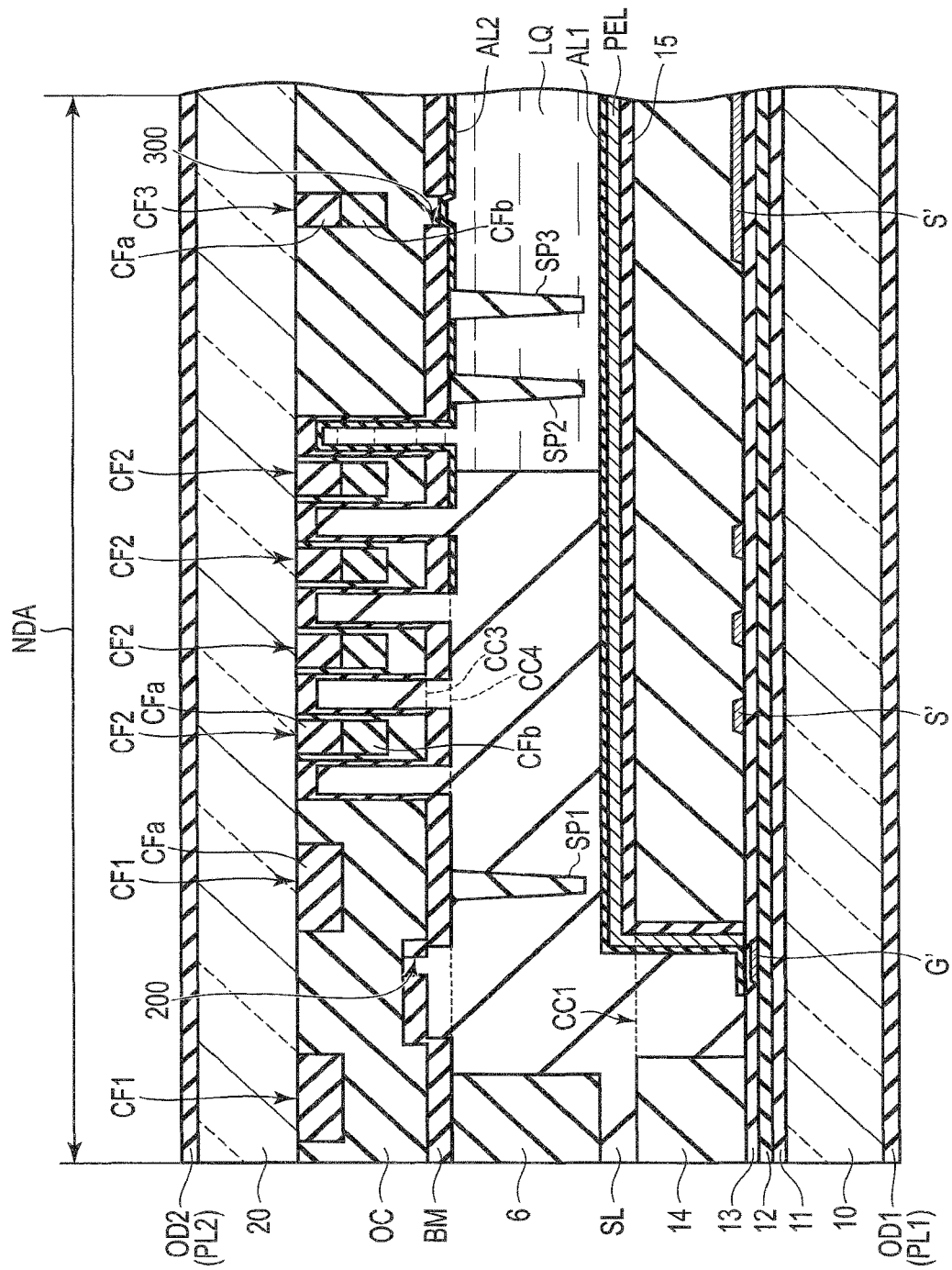
FIG. 7 is a cross section showing a modification of the display device of the embodiment.

FIG. 7 is a cross section showing a modification of the display device according to the above-described embodiment. As compared to that of FIG. 4, the structure shown in FIG. 6 is different in that a recess portion CC3 is formed penetrate the overcoat layer OC to the second insulating substrate 20.

The light-shielding layer BM is in contact with the second insulating substrate 20 inside the recess portion CC3. In this modification, the recess portion CC4 of the light-shielding layer BM is deeper as compared to that of the above-described embodiment, and therefore it becomes possible to further expand the contact area between the sealing member SL and the light-shielding layer BM.

With this modification, an advantageous effect similar to that described above can be obtained.

Note that in this modification, the second portion CF2 need not to be formed and if not formed, an advantageous effect similar to that described above can be obtained by forming the recess portion CC3 to penetrate the overcoat layer OC to the second insulating substrate 20. In this case, the overcoat layer OC is patterned by photo-curing to form the recess portion CC3.

Figure 8:
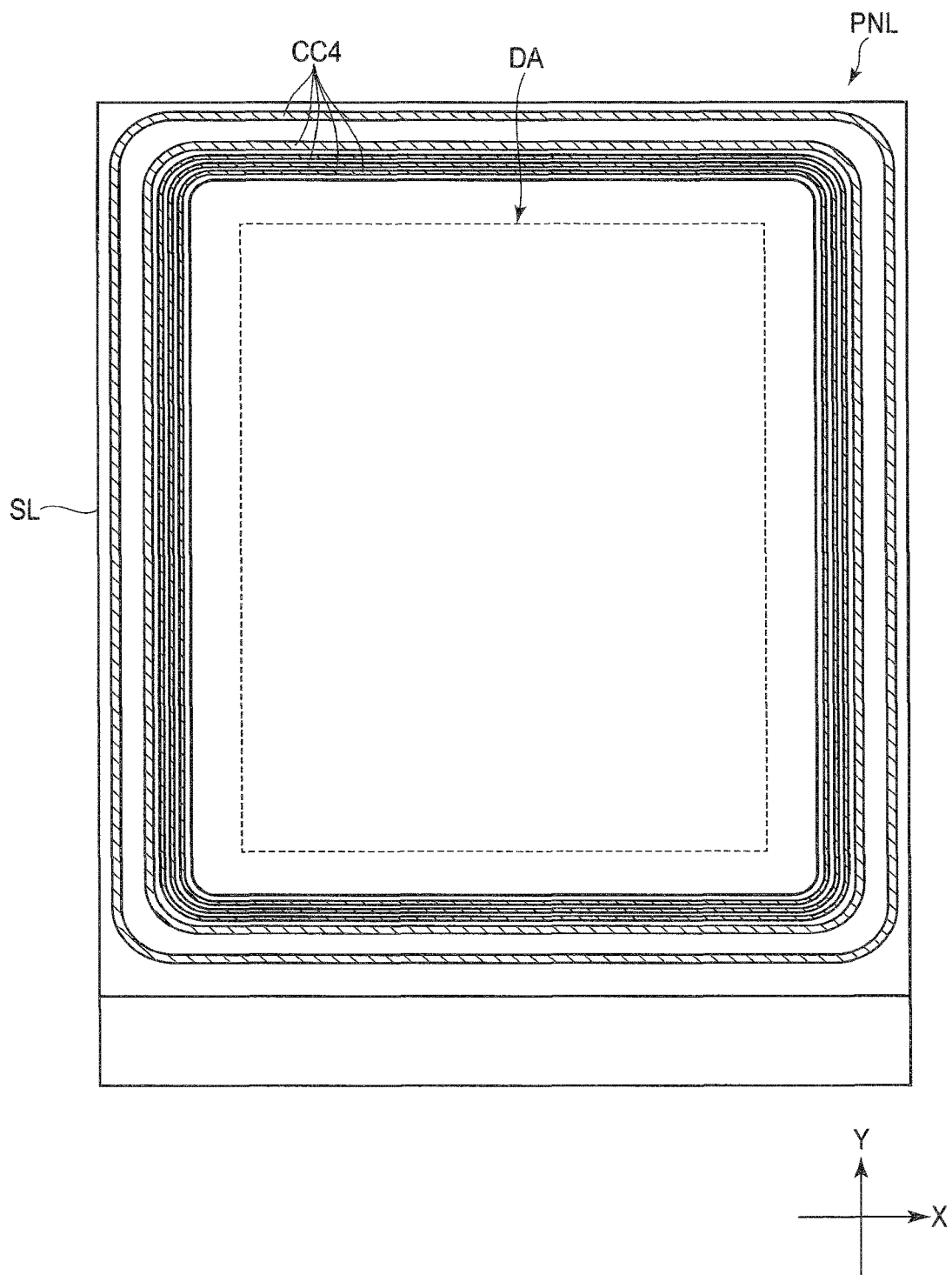
FIG. 8 is a plan view showing the display panel shown in FIG. 1, indicating the positions of recess portions.

FIG. 8 is a plan view showing the display panel PNL shown in FIG. 1, illustrating the positions of recess portions CC4.

In the example shown in FIG. 8, the recess portions CC4 of the light-shielding layer are provided continuously around the entire circumference of the non-display area NDA. In other words, the recess portions of the color filters and the recess portions of the overcoat layer are arranged continuously around the entire circumference of the non-display area NDA. With the recess portions CC4 so arranged, the bonding strength between the sealing member SL and the second substrate SUB2 can be enhanced over the entire circumference of the non-display area NDA.

Figure 9:
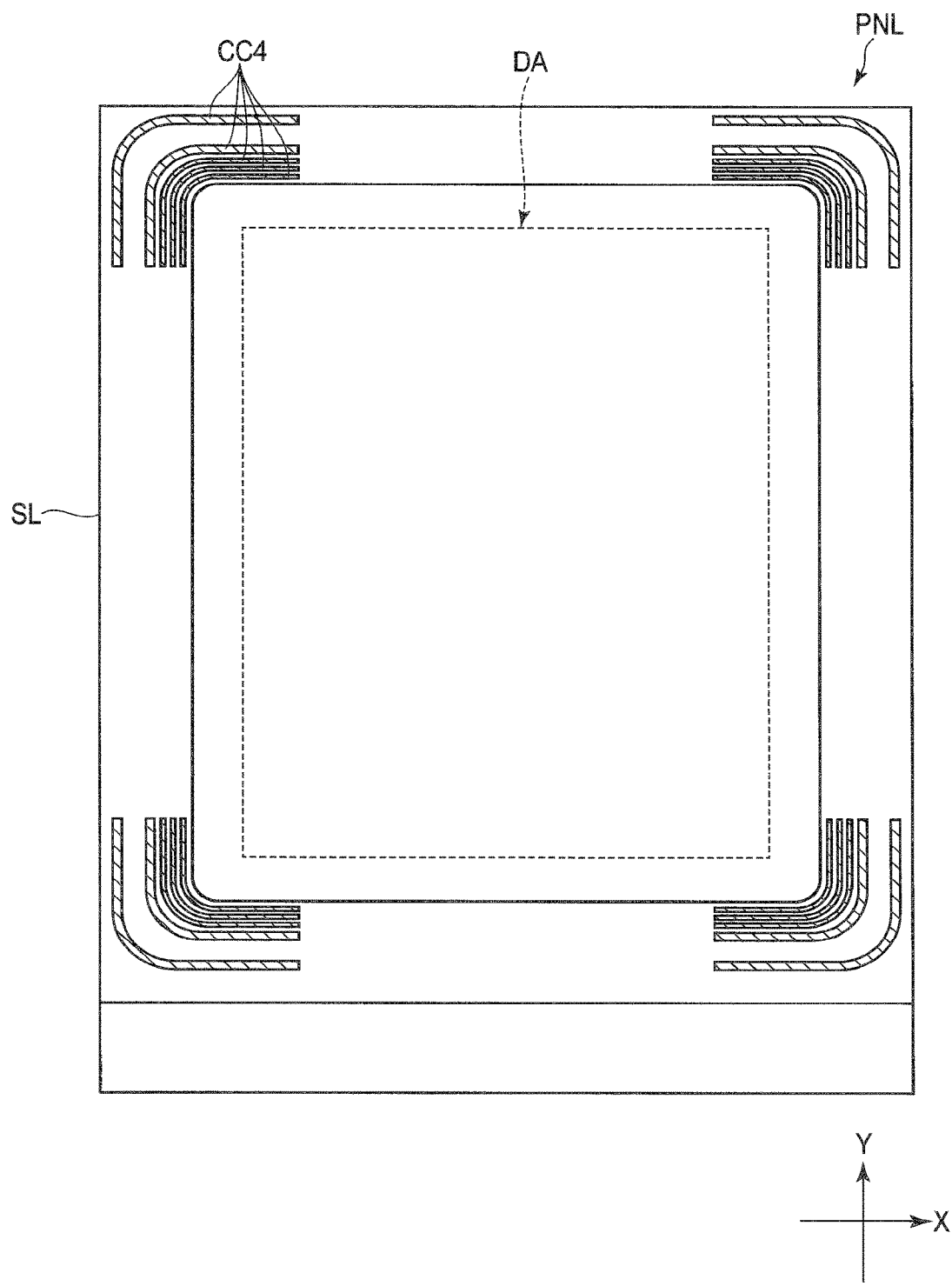
FIG. 9 is a cross section showing the first modification of the recess portions of the embodiment.

FIG. 9 is a cross section showing the first modification of the recess portions CC4 of the above-described embodiment. As compared to that of FIG. 8, the structure shown in FIG. 9 is different in that the recess portions CC4 are formed in four corners of the non-display area NDA. In this case, the recess portions of the color filters and the recess portions of the overcoat layer are formed in the four corners of the non-display area NDA.

In the four corners of the display panel PNL, moisture can easily enter from the first direction X, and the second direction Y, and therefore the bonding strength between the sealing member SL and the first substrate SUB1 or the second substrate SUB2 may become weak undesirably. But, with the recess portions CC4 provided in the four corners of the display panel PNL as illustrated, the bonding strength between the sealing member SL and the second substrate SUB2 can be enhanced. In such a modification, an advantageous effect similar to that described above can be obtained.

Figure 10:
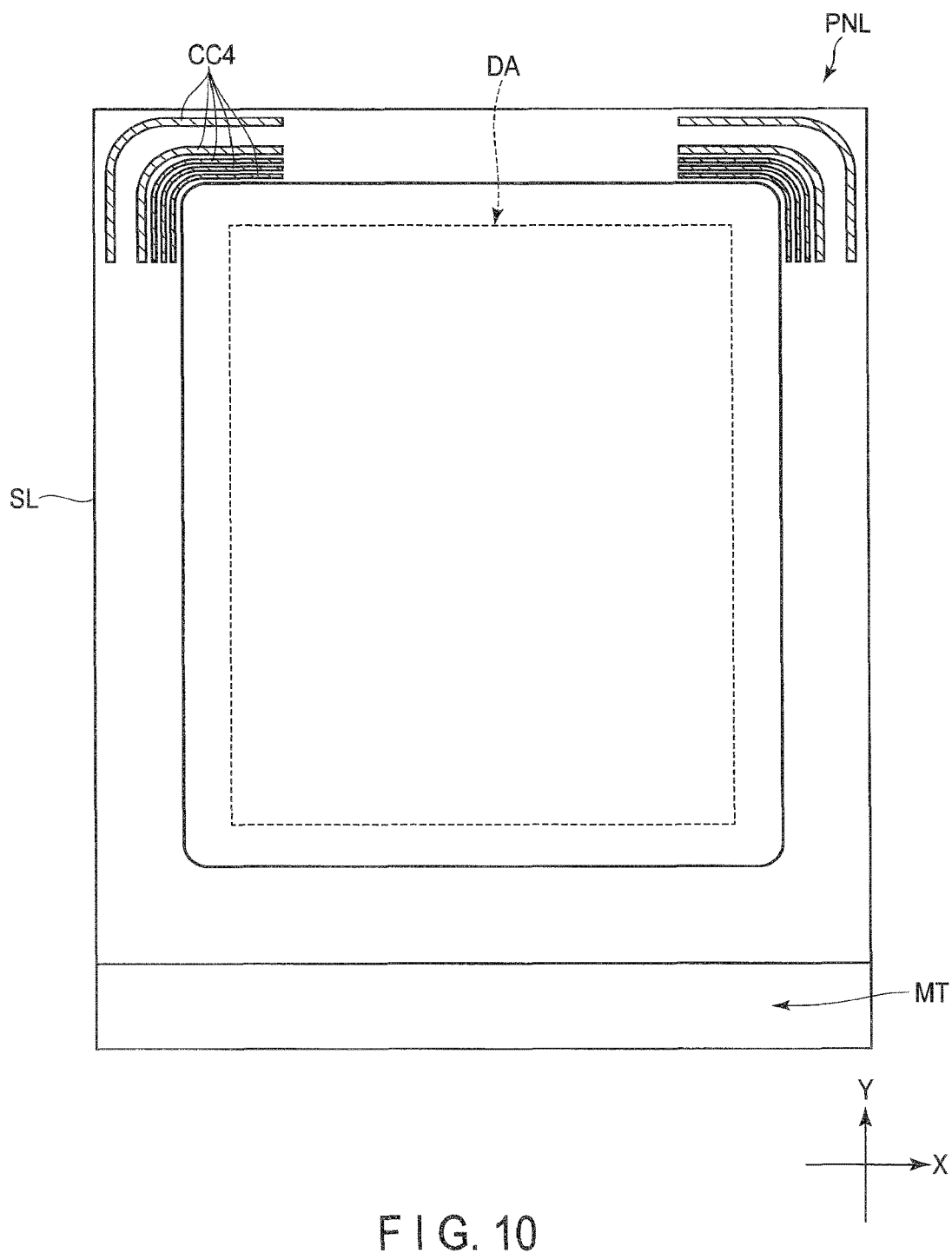
FIG. 10 is a cross section showing the second modification of the recess portions of the embodiment.

FIG. 10 is a cross section showing the second modification of the recess portion CC4s of the above-described embodiment. As compared to that of FIG. 8, the structure shown in FIG. 10 is different in that the recess portions CC4 are formed in two corners of the non-display area NDA. In this case, the recess portions of the color filters and the recess portions of the overcoat layer are formed in two corners of the non-display area NDA.

The recess portions CC4 are provided in two corners on a terminal side, which is opposite to a mounting portion MT side of the display panel PNL. As shown in FIG. 1, the seal portion SL4 is formed less in width as compared to the seal portion SL1 on the side of the mounting portion MT. With this structure, from the two corners of the opposite side to the mounting portion MT, moisture can easily enter the mounting portion MT, as compared with the other two corners on the mounting portion MT. With the recess portions CC4 arranged as illustrated, the bonding strength between the sealing member SL and the second substrate SUB2 can be enhanced in the two corners of the opposite side, and thus the entering of moisture to the mounting portion MT can be inhibited.

In such a modification, an advantageous effect similar to that described above can be obtained.

Figure 11:
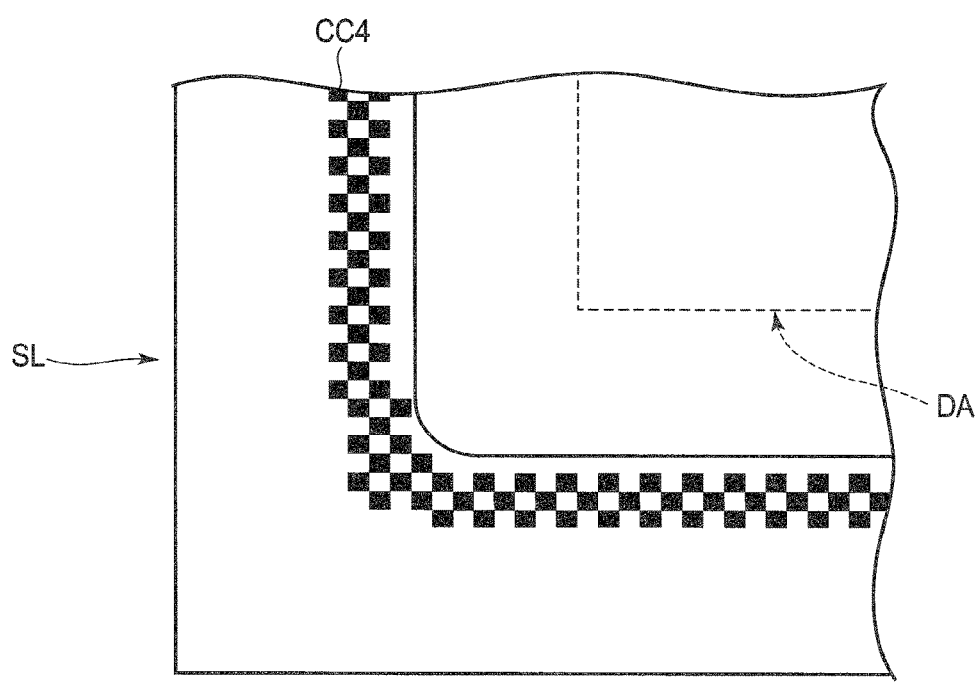
FIG. 11 is a cross section showing the third modification of the recess portions of the embodiment.

FIG. 11 is a cross section showing the third modification of the recess portion CC4 according to the above-described embodiment.

In the example shown in FIG. 11, the recess portions CC4 are formed in a checkerboard pattern. In this case, the color filters are arranged in a checkerboard pattern in the area overlapping the sealing member SL, for example. That is, the recess portions of the color filters are formed in a checkerboard pattern, and consequently the recess portions CC3 are formed in the overcoat layer OC in a checkerboard pattern. In this manner, the recess portions CC4 of the light-shielding layer are formed in a checkerboard pattern. Alternatively, for example, the recess portions may be formed in the overcoat layer OC in a checkerboard without forming any recess portion in the color filters.

In such a modification, an advantageous effect similar to that described above can be obtained.

As described above, according to this embodiment, a liquid crystal display with an improved reliability can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a switching element, a pixel electrode, and a first alignment film;
a second substrate including an insulating substrate, a color filter layer, an overcoat layer, a light-shielding layer, and a second alignment film;
a sealing member which attaches the first substrate and the second substrate in a non-display area in a shape of a frame surrounding a display area; and
a liquid crystal layer disposed in space surrounded by the first substrate, the second substrate and the sealing member,
wherein the color filter layer is disposed between the insulating substrate and the overcoat layer in the non-display area,
the overcoat layer is disposed between the color filter layer and the light-shielding layer in the non-display area,
the light-shielding layer is disposed between the overcoat layer and the second alignment film in the non-display area,
the overcoat layer includes a first recess portion formed therein in the non-display area, and
the light-shielding layer overlaps with the first recess portion.

2. The liquid crystal display device of claim 1, wherein the second alignment film is in contact with the light-shielding layer in the non-display area.

3. The liquid crystal display device of claim 2, wherein the sealing member is in contact with the second alignment film in a position overlapping a portion of the light-shielding layer, which is in contact with the first recess portion.

4. The liquid crystal display device of claim 1, wherein the color filter layer includes a first portion and a second portion, a width of the first portion is greater than that of the second portion and a height of the first portion is lower than that of the second portion.

5. The liquid crystal display device of claim 4, wherein the first portion is a monolayer and the second portion is a stack layer comprising two or more layers.

6. The liquid crystal display device of claim 1, wherein the light-shielding layer comprises a first slit in a position overlapping the first recess portion, and the first substrate comprises a wiring line in a position where overlaps the first slit.

7. The liquid crystal display device of claim 5, wherein the light-shielding layer comprises a second slit in the non-display area, and
the color filter layer includes a third portion located in a position overlapping the second slit.

8. The liquid crystal display device of claim 7, wherein, the third portion is a stack layer of a first layer and a second layer.

9. The liquid crystal display devices of claim 8, wherein the first layer and the second layer are formed of resin materials colored in different colors.

10. The liquid crystal display device of claim 3, wherein the first substrate includes an organic insulating film comprising a second recess portion, and
the sealing member is disposed inside the second recess portion.

11. The liquid crystal display device of claim 10, wherein the first substrate further comprises:
the first alignment film which covers the pixel electrode; and
a transparent electrode disposed on a side surface of the second recess portion, and
the first alignment film covers the transparent electrode disposed on the side surface of the second recess portion.

12. The liquid crystal display device of claim 10, wherein the second recess portion opposes the first recess portion.

13. The liquid crystal display device of claim 3, wherein the second substrate further comprises a spacer disposed inside the sealing member, and the spacer is formed continuously around an entire circumference of the non-display area.

14. The liquid crystal display device of claim 3, wherein the first recess portion penetrates the overcoat layer and exposes the insulating substrate, and
the light-shielding layer is in contact with the insulating substrate within the first recess portion.

15. The liquid crystal display device of claim 3, wherein the first recess portion is formed around an entire circumference of the non-display area.

16. The liquid crystal display device of claim 3, wherein the first recess portion is located in four corners of the non-display area.

17. The liquid crystal display device of claim 3, further comprising a mounting portion disposed at an end of the first substrate, wherein the first recess portion is located in two corners of the non-display area, on a side opposite to the mounting portion.

18. The liquid crystal display device of claim 3, wherein the first recess portion is formed in a checkerboard pattern.

* * * * *